(12) United States Patent
Limbrunner et al.

(10) Patent No.: US 10,399,396 B2
(45) Date of Patent: Sep. 3, 2019

(54) SYSTEM AND METHOD FOR DETERMINING AT LEAST ONE TIRE CONTACT AREA PARAMETER CHARACTERIZING A DIMENSION OF A TIRE CONTACT AREA ON A TIRE OF A WHEEL OF A VEHICLE

(71) Applicant: CONTINENTAL AUTOMOTIVE GMBH, Hannover (DE)

(72) Inventors: Florian Hubert Limbrunner, Regensburg (DE); Matthias Kretschmann, Wenzenbach (DE)

(73) Assignee: Continental Automotive GmbH, Hannover (DE)

( * ) Notice: Subject to any disclaimer, the term of this patent is extended or adjusted under 35 U.S.C. 154(b) by 115 days.

(21) Appl. No.: 15/533,052

(22) PCT Filed: Dec. 18, 2015

(86) PCT No.: PCT/EP2015/080524
§ 371 (c)(1),
(2) Date: Jun. 5, 2017

(87) PCT Pub. No.: WO2016/102377
PCT Pub. Date: Jun. 30, 2016

(65) Prior Publication Data
US 2017/0334254 A1    Nov. 23, 2017

(30) Foreign Application Priority Data

Dec. 22, 2014   (DE) .................. 10 2014 226 783

(51) Int. Cl.
*B60C 11/24*    (2006.01)
*B60C 19/00*    (2006.01)
(Continued)

(52) U.S. Cl.
CPC .......... *B60C 23/064* (2013.01); *B60C 11/246* (2013.01); *B60T 8/1725* (2013.01);
(Continued)

(58) Field of Classification Search
CPC ................. B60C 23/064; B60C 11/246; B60C 2019/004; B60T 8/1725; B60W 40/12; B60W 2422/70
See application file for complete search history.

(56) References Cited

U.S. PATENT DOCUMENTS

| 6,538,566 | B1 | 3/2003 | Morand et al. |
| 6,539,295 | B1 | 3/2003 | Katzen et al. |

(Continued)

FOREIGN PATENT DOCUMENTS

| CN | 1878691 A | 12/2006 |
| DE | 102006040912 A1 | 5/2007 |

(Continued)

*Primary Examiner* — Russell Frejd
(74) *Attorney, Agent, or Firm* — Laurence A. Greenberg; Werner H. Stemer; Ralph E. Locher

(57) ABSTRACT

A system for determining a tire contact area parameter includes a sensor module on the tire. The sensor module has a sensor that receives a sensor signal which is dependent on a mechanical tire load at a predetermined measuring point on the tire. A first evaluation device evaluates the sensor signal and provides data based on the sensor signal. The data contain a data element which indicates a time point in the sensor signal. The time point characterizes a passage of the measuring point through the tire contact area. A second evaluation device calculates the tire contact area parameter by evaluating the data provided by the first evaluation device. The first evaluation device analyzes the sensor signal based on a predetermined evaluation criterion with respect to the signal quality of the sensor signal to provide signal quality information of the sensor signal.

15 Claims, 5 Drawing Sheets

(51) Int. Cl.
   *B60C 23/06* (2006.01)
   *B60T 8/172* (2006.01)
   *B60W 40/12* (2012.01)

(52) U.S. Cl.
   CPC ....... *B60W 40/12* (2013.01); *B60C 2019/004* (2013.01); *B60W 2422/70* (2013.01)

(56) References Cited

U.S. PATENT DOCUMENTS

| | | | |
|---|---|---|---|
| 6,626,035 B1* | 9/2003 | Dent | G01L 1/146 340/442 |
| 7,543,491 B2* | 6/2009 | Hammerschmidt | B60C 23/064 73/146.5 |
| 7,756,670 B2 | 7/2010 | Mancosu et al. | |
| 8,386,223 B2* | 2/2013 | Martin | G06F 17/5009 703/6 |
| 8,558,680 B2* | 10/2013 | Pannek | B60C 11/24 152/415 |
| 2004/0226642 A1* | 11/2004 | Muhlhoff | B60C 3/04 152/454 |
| 2007/0255510 A1 | 11/2007 | Mancosu et al. | |
| 2008/0208502 A1 | 8/2008 | Koukes et al. | |
| 2010/0299083 A1 | 11/2010 | Jiang et al. | |
| 2010/0324858 A1 | 12/2010 | Pannek et al. | |
| 2013/0169813 A1* | 7/2013 | Schaefer | B60C 11/24 348/148 |
| 2016/0041004 A1 | 2/2016 | Burkhardt et al. | |

FOREIGN PATENT DOCUMENTS

| | | |
|---|---|---|
| DE | 102006041867 A1 | 3/2008 |
| DE | 102008007775 A1 | 8/2009 |
| DE | 102009057580 A1 | 6/2011 |
| DE | 102010016551 A1 | 10/2011 |
| DE | 102013102323 A1 | 9/2014 |
| EP | 2774784 A1 | 9/2014 |
| JP | 2010159031 A | 7/2010 |

* cited by examiner

SYSTEM AND METHOD FOR DETERMINING AT LEAST ONE TIRE CONTACT AREA PARAMETER CHARACTERIZING A DIMENSION OF A TIRE CONTACT AREA ON A TIRE OF A WHEEL OF A VEHICLE

BACKGROUND OF THE INVENTION

Field of the Invention

The present invention relates to a system and a method for determining at least one tire contact area parameter characterizing a dimension of a tire contact area (tire contact patch) on a tire of a wheel of a vehicle.

Known from DE 10 2010 016 551 A1 is a method in which a contact area length of a vehicle tire is determined by means of a tire module disposed on the tire inner side. The tire module contains a deformation sensor and evaluates the deformation of the vehicle tire on entry into and exit from the ground contact area and determines from this the contact area length of the tire. The relevant measured values for the contact area length are transmitted to a central receiving unit in the vehicle and are evaluated there with an algorithm in order to monitor the tread depth of the tire by means of a long-term statistic performed on the measured values.

Known from EP 2 774 784 A1 is a tire contact area determination by means of a transmission of a raw signal of a sensor disposed on the tire of a vehicle, which requires a higher transmission capacity of the relevant transmission section.

Since a determined tire contact area parameter (e.g. a contact area length) in particular in modern motor vehicles is frequently used to determine further information such as, for example, a tire tread depth or a wheel load (and based on this, for example, vehicle loading), the measured values of the relevant tire contact area parameter provided for this purpose should be as reliable and precise as possible.

However, perturbing influences which occur in practice, which can have various causes (e.g. electromagnetic perturbing radiation, particular condition, e.g. bumpiness of the ground over which the vehicle is traveling, tire imbalance, mounted tire accessory, etc.) are problematical in a determination of tire contact area. These perturbing influences can falsify the useful signal produced by the sensor and/or its processing to form the data signal in various ways. There is then frequently the risk that the provided data are unsuitable for the usage purposes based on these data.

SUMMARY OF THE INVENTION

It is an object of the present invention to enable an increased reliability of the determined tire contact area parameter in a system and a method for determining at least one tire contact area parameter characterizing a dimension of a tire contact area on a tire of a wheel of a vehicle.

According to one aspect of the invention, a system for determining at least one tire contact area parameter characterizing a dimension of a tire contact area on a tire of a wheel of a vehicle is provided, wherein the system comprises a sensor module arranged on the tire comprising a sensor configured to receive a sensor signal which is dependent on a mechanical tire loading at a predetermined measuring point on the tire, and a first evaluation device configured to evaluate the sensor signal and to provide, based thereon, data, which contain at least one data element which specifies at least one time point in the sensor signal characterizing a passage of the measuring point through the tire contact area. In addition, the system comprises a second evaluation device configured to calculate the tire contact area parameter by evaluating the data provided by the first evaluation device. In the system according to the invention, the first evaluation device is further configured to perform an analysis of the sensor signal by reference to at least one predetermined evaluation criterion relating to the signal quality of the sensor signal in order to provide quality information characterizing the signal quality of the sensor signal.

If perturbing influences falsify the sensor signal, this circumstance can thus advantageously be "ascertained" according to the invention by the quality information so that in particular within the framework of a further use of the determined tire contact area parameter, an appropriate response to this can be made.

The knowledge obtained according to the invention (quality information) about any existence of perturbing influences has various advantages.

Thus, for example, depending on a result of the analysis of the sensor signal, a perturbation suppression adapted to the specific perturbing influence can be applied to the sensor signal before the data for determining the tire contact area parameter are produced from this (perturbation-reduced) signal.

Alternatively or additionally, depending on a result of the analysis of the sensor signal, for example, a use of the determined tire contact area parameter can be prevented or at least partially restricted.

Furthermore and particularly advantageously, the result of the analysis of the sensor signal can even be used to provide information for vehicle electronics and/or the driver about specific driving circumstances such as an imbalance on a wheel, an occurrence of slippage, an occurrence of aquaplaning, an impermissibly high speed when snow chains are applied, and much more. Within the framework of the invention, in principle all driving circumstances can be identified and/or (more accurately, e.g. by specifying a dimension) characterized, the occurrence of which results in a typical perturbation in the sensor signal in each case, so that conversely, namely by the analysis of the sensor signal, the mentioned identification and/or characterization can be accomplished.

Since, in a system for determining at least one tire contact area parameter characterizing a dimension of a tire contact area on a tire of a wheel of a vehicle according to the aforesaid aspect of the invention, the sensor module arranged on the tire not only comprises the sensor for receiving a sensor signal but also the first evaluation device for evaluating the sensor signal and providing data based thereon, the advantage is further obtained that the sensor signal as such does not have to be transmitted for a further processing or use to a vehicle-based, e.g. central control device of the vehicle provided for this purpose. On the contrary, it is possible to transmit an information-reduced data signal which imposes substantially lower requirements on the bandwidth of the transmission section (e.g. radio connection) to such a control device.

The first evaluation device provides data which contain at least one data element, which specifies at least one time point in the sensor signal characterizing a passage of the measuring point through the tire contact area. In such a system, a resource-saving transmission of the relevant data is therefore advantageously possible.

In addition, as already explained above, the system comprises the second evaluation device, by means of which the at least one tire contact area parameter is calculated by evaluating the data provided by the first evaluation device. The second evaluation device like the first evaluation device can be tire-based and, for example, combined structurally with the first evaluation device for this purpose or implemented as a further functionality of an evaluation device contained by the tire-based sensor module and to be considered as a unit. Alternatively however, the second evaluation device can also be arranged separately from the first evaluation device, for example as a vehicle-side second evaluation device or a corresponding functionality of a device provided on the vehicle side (e.g. of a central control device).

In the aforesaid system, the analysis which results in the provision of the quality information characterizing the signal quality of the sensor signal is performed by means of the first and therefore tire-based evaluation device. A conceivable (within the framework of the invention in no way excluded as an additional measure) analysis in contrast to this of the signal quality of the sensor signal by reference to the (information-reduced) data provided by evaluation of the sensor signal, e.g. only in the second evaluation device or a vehicle-side central device would not be in a position to provide particularly precise quality information as in the aforesaid system. The latter requires an analysis of the sensor signal as such as provided in the aforesaid system (e.g. of a data signal generated by digitizing an analog sensor signal without any significant loss of information).

The invention can advantageously be used in particular in multi-wheel motor vehicles in order to thus determine the tire contact area parameter individually for each wheel, i.e. separately for a plurality of, in particular all the wheels. It is understood that only tire-based system components corresponding to the number of wheels are required multiple times for this whereas vehicle-side components can be used jointly.

The two evaluation devices are preferably implemented by one or two program-controlled devices, on which corresponding evaluation algorithms run.

In one embodiment of the system according to the invention, the first evaluation device is further configured to perform a quantification of the signal quality of the sensor signal depending on a result of the analysis. The quality information in this case contains one or more values for the numerical characterization of the signal quality or individual signal quality parameters (e.g. external frequency amplitudes, noise amplitudes etc.). Based in particular, for example, on these values, for example the detection and/or characterization of particular driving circumstances already mentioned above (bad road, imbalance, slippage, aquaplaning, snow chains etc.) can be performed.

Alternatively or additionally, the first evaluation device can be further configured to perform a classification of the signal quality of the sensor signal into at least one quality class of a plurality of predetermined quality classes. In the simplest case, this includes the fact that the quality information contains information about the classification of the signal quality either in a class "signal quality good" or a class "signal quality poor". Based in particular, for example, on such a classification, for example the prevention or at least partial restriction already mentioned above of a further use of the determined tire contact area parameter can be implemented.

In any case, the quality information provided according to the invention advantageously enables an appropriate response in the case of falsifications of the sensor signal or the useful information contained therein. For example, determination values for a tire contact area parameter can be eliminated in the case of further evaluations or uses of the tire contact area parameter on the basis of a sensor signal evaluated or classified as poor or too poor.

According to one embodiment, the quality information which characterizes the signal quality of the sensor signal is provided separately from the data which contain the at least one data element, which specifies the at least one time point in the sensor signal characterizing a passage of the measuring point through the tire contact area.

Usually, however, it is preferable if the first evaluation device is configured to bring about an incorporation of at least one further data element characterizing the signal quality of the sensor signal in the data to be provided depending on a result of the analysis. One or more such further data elements can then be advantageously used, for example, for coding the information to be specified within the framework of a quantification and/or classification.

The latter embodiment is particularly advantageous when at least not every type or every extent of perturbations in the sensor signal should have the result that the measured values then recorded are completely discarded for a vehicle-side further processing and/or use.

A transmission section available in any case for example (e.g. radio connection) for the transmission of the data provided by the first evaluation device to a vehicle-side device can be advantageously co-used in this embodiment in order to also transmit the quality information in the form of (at least) one further data element. The vehicle-side device can then itself decide concerning a further use of such measured values after receiving the relevant data. In addition, such a vehicle-side device (e.g. central control device of the vehicle) with its typically relatively high computing capacity is frequently, for example, particularly suitable in order to implement the detection and/or characterization of particular driving circumstances already mentioned above on the basis of the provided data. In the data to be transmitted over the said transmission section, optionally the calculated tire contact area parameter can also already be coded (with the tire-based arrangement of the second evaluation device).

Alternatively or (in specific cases) additionally to an incorporation of at least one further data element in the data provided by the first evaluation device, it is also possible that the first evaluation device is further configured to prevent the provision of the data depending on a result of the analysis.

If or as long as the first evaluation device does not provide any data, the calculation of the tire contact area parameter by the second evaluation device which takes place by means of an evaluation of such data (whether it is the case that this second evaluation device is combined in a tire-based manner with the first evaluation device or is arranged separately from this in vehicle-based manner) is omitted.

In the invention, the sensor of the tire-based sensor module delivers a sensor signal dependent on a mechanical tire loading at a predetermined measuring point on the tire.

For the configuration of this sensor, prior art relating to such tire contact area sensors can advantageously be used within the framework of the invention. In particular, sensors or sensor modules connected, for example, in the area of the measuring point to a tire material and, for example, having an acceleration sensor or shock sensor can be used for measuring an acceleration (including "shock") or a tire deformation. At this point a strain gage or a so-called "bending element" can also be used.

According to one embodiment, the sensor module is arranged on an inner side of the tire (e.g. inner side of the tread of the tire) and the sensor is configured to produce the sensor signal (e.g. time-dependent analog voltage signal or digital signal produced by digitizing the same) depending on a local tire deformation and/or an acceleration in the region of the location point of the sensor module.

Alternatively, for example, a sensor can be used which is arranged on a rim of the vehicle wheel and, for example, measures in an optical manner or for example by means of ultrasound a radial distance between this sensor and a measuring point on the opposite inner side of the tire and therefore also delivers a sensor signal which is dependent on a mechanical tire loading (here: tire deformation) at the predetermined measuring point.

As already explained, the data provided by the first evaluation device on the basis of an evaluation of the sensor signal contain at least one data element, which specifies at least one time point in the sensor signal characterizing a passage of the measuring point through the tire contact area. In one embodiment at least one data element in these data characterizes a beginning of a time interval of the passage of the measuring point through the tire contact area. In one embodiment, at least one data element in these data characterizes a center of a time interval of the passage of the measuring point through the tire contact area.

In one embodiment, at least one data element in these data characterizes an end of a time interval of the passage of the measuring point through the tire contact area.

In particular, if for example information about the instantaneous rotational position of the relevant vehicle wheel is present from other systems of vehicle electronics (e.g. central control device), the characterization of a single one of the aforesaid time points by a data element can already be sufficient to determine for example a contact area length by the system according to the invention.

Preferably however the at least one data element characterizes at least a beginning and an end of the said passage time interval.

If the sensor module for example comprises an acceleration or shock sensor arranged at the measuring point on the tire or a strain gage or the like, for example a time-dependent sensor signal can be recorded therewith which in each case indicates a defined signal maximum (corresponding to a beginning and an end of the time interval of the passage of the measuring point through the tire contact area) when a tire point impinges and is raised in the region of the sensor (measuring point). When viewed in terms of time, the sensor signal between these maxima can indicate, for example, a defined signal minimum corresponding to a center of the time interval of the passage of the tire contact area. In this example, the two maxima with the interposed minimum in the time profile of the sensor signal form a tire contact area characteristic, which normally recurs in the time profile of the sensor signal with each complete revolution (360°) of the relevant wheel. In the time intervals between such a tire contact area characteristic, the sensor, depending on the configuration, can for example deliver a substantially constant sensor signal.

As far as the at least one predetermined evaluation criterion is concerned, which is used in the analysis of the sensor signal by the first evaluation device, numerous configurations come into consideration for this.

Expediently, such evaluation criteria in the evaluation focus on whether and/or how far the time profile of the sensor signal recorded by the sensor is compatible with an ideal temporal sensor signal profile to be expected without perturbing influences. Such an ideal signal profile can, for example, be determined experimentally under ideal conditions (without perturbing influences) and used as the basis for the evaluation criteria predetermined according to the invention.

Within the framework of the invention, an examination for the fulfillment of one or more evaluation criteria can be performed in each case both exclusively taking into account the sensor signal or however also taking into account one or more further items of information present (e.g. stored in the sensor module) or determined in the relevant vehicle (e.g. tire type, tire diameter, vehicle speed, vehicle acceleration, tire inner pressure etc.).

In one embodiment, the evaluation criterion relating to the signal quality of the sensor signal used in the analysis performed by the first evaluation device includes the fact that (at least) a signal-noise ratio of the sensor signal fulfills (at least) one predetermined signal-noise ratio criterion.

This embodiment is based on the consideration that certain perturbing influences (e.g. unevenesses of the ground over which the vehicle is traveling) give reason to expect an increased noise component in the sensor signal, which can be identified by a signal-noise analysis.

A signal-noise ratio can generally be seen as a ratio of a signal parameter specifying the magnitude of a signal component and a signal parameter specifying the magnitude of a noise component.

As a signal-noise ratio criterion, it can be provided for example that a signal-noise ratio of the sensor signal determined in a specific manner lies within a predetermined range. For this purpose, for example, it is possible to use a signal-noise ratio which represents a signal amplitude obtained in the temporal range of the aforementioned tire contact area characteristic in the sensor signal (e.g. a maximum value or a difference between a maximum value and a minimum value) or, for example, relates it to a signal amplitude obtained in the temporal range outside the tire contact area characteristic (e.g. in the center between successive tire contact area characteristics).

In one embodiment, the evaluation criterion relating to the signal quality of the sensor signal used in the analysis performed by the first evaluation device includes the fact that a frequency spectrum of the sensor signal obtained by means of frequency analysis fulfills at least one predetermined frequency criterion.

This embodiment is on the one hand based on the consideration that after each complete revolution of the relevant wheel, a tire contact area characteristic in the sensor signal is to be expected, which leads to a certain periodicity of this characteristic in the time profile of the sensor signal. The latter can in turn easily be checked by a frequency analysis on the sensor signal. In this context, it is advantageously added that due to the rotation of the vehicle wheel not only a certain periodicity (equivalent to a maximum in the frequency spectrum) with regard to the recurrence of the tire contact area characteristic is to be expected but also certain periodicities or frequency components within the tire contact area characteristic itself which are related to this. The latter expectation can also be taken into account by the at least one predetermined frequency criterion.

The embodiment in which at least one predetermined frequency criterion is used is on the other hand based on the consideration that certain perturbing influences (e.g. bad road) give reason to expect the excitation of tire-typical eigen-oscillation modes and therefore an increased proportion of the relevant frequency (frequencies) in the sensor signal, which can be identified by a frequency analysis. Against the background that depending on the tire properties, the eigenfrequencies of the tire are more or less blurred in the frequency spectrum, alternatively or additionally a signal-noise analysis can also advantageously be used to detect and/or characterize these perturbing influences (or assignable driving circumstances).

In an advantageous further development of the embodiment in which at least one predetermined frequency criterion is used, a driving speed (vehicle longitudinal speed) and/or a rotational speed (e.g. rotational angular speed) of the relevant wheel is taken into account when checking whether the frequency criterion is fulfilled. Alternatively or additionally a vehicle acceleration (e.g. vehicle longitudinal acceleration) and/or a rotational acceleration (e.g. rotational angular acceleration) of the relevant wheel can be taken into account.

This further development is an example of a generally advantageous analysis of the sensor signal within the framework of the invention also taking into account further information (here, for example vehicle longitudinal speed and/or wheel rotational speed or corresponding accelerations) which can also be provided by another system detecting operating parameters of the vehicle (e.g. ABS, ESP etc.).

In particular however, as far as allowance for the rotational angular speed of the relevant wheel is concerned when checking whether the predetermined frequency criterion is fulfilled, according to a further development it is provided that this rotational angular speed (alternatively or additionally to a provision by other systems such as ABS, ESP etc.) is provided within the framework of the evaluation of the sensor signal by the first evaluation device itself, whereby that frequency at which a corresponding maximum is observed in the obtained frequency spectrum of the sensor signal is identified for example as the wheel rotation frequency (corresponding to the rotational angular speed).

A particular advantage of the further development in which the vehicle longitudinal speed and/or the wheel rotational speed is also taken into account consists in that when checking the frequency criterion, not only the presence of the periodicity of a tire contact area characteristic in the time profile of the sensor signal which is to be expected and is explained above can be checked but also whether the value of the periodicity (period length or equivalent recurrence frequency) matches the vehicle longitudinal speed or wheel rotational speed.

In summary, it can thus in particular be provided as a predetermined frequency criterion that the frequency spectrum has a maximum which can be assigned to the wheel rotational speed and optionally the frequency of this maximum is plausible (e.g. by means of an assessment by means of a recorded vehicle longitudinal speed and/or wheel rotational speed).

In at least one of the evaluation criteria used, it can be provided that this is considered to be fulfilled when one or more signal parameters obtained from the sensor signal by the evaluation of the sensor signal each lie within a range of values each assigned to the signal parameters.

Such signal parameters can be received as such by the first evaluation device, e.g. as information in the course of the already-mentioned quantification in the quality information relating to the sensor signal quality. Accordingly, the results of the examination as to whether the signal parameters each lie within the assigned range of values or not, can be received as information in the course of the already-mentioned classification or quantification (extent of deviation) in the quality information.

The signal values at maxima and/or minima in the sensor signal profile, for example, are considered as signal parameters. Furthermore, for example, at least one maximum-minimum amplitude and/or at least one temporal average in the sensor signal can be used as signal parameter. Furthermore, temporal positions or position spacings of maxima, minima etc. are considered if these are not caused by the actual measurement.

Signal parameters, e.g. of the aforementioned type or the evaluation thereof can, instead of being based on the time profile of the sensor signal, also be based on the profile of a time derivative obtained therefrom (rate of change) and/or a frequency spectrum obtained therefrom.

Finally, a plurality of the aforesaid signal parameters can also be mathematically linked to one another in order to form (at least) one more complex/composite signal parameter therefrom. An example for this is the signal-noise ratio already mentioned above if this is formed as a quotient of two values.

If when analyzing the sensor signal, it is checked whether a signal parameter lies within a range of values assigned to this signal parameter, according to a further development it can be provided that at least one of the limits of this range of values is specified as a function of vehicle operating parameters such as, in particular, for example the vehicle longitudinal speed and/or the wheel rotational speed and/or the relevant wheel load and/or a relevant tire inner pressure.

In particular, if the sensor module which is present in any case is configured accordingly (e.g. additional tire pressure sensor), the tire inner pressure can be determined by this sensor module.

In one embodiment it is provided as the evaluation criterion used for the analysis that a development of signal parameters of the sensor signal observed over a relatively long time interval, i.e. for example over a plurality of revolutions of the wheel, satisfies at least one plausibility criterion relating to this time evolution. Such a plausibility criterion can, for example, consist in that a time variation of a signal parameter such as, for example, of a signal-noise ratio of the sensor signal normally does not take place abruptly. If it does however, this could give an indication, for example, of a change in specific driving circumstances such as, for example, change in the condition of the ground over which the vehicle is traveling, occurrence of so-called aquaplaning or mounting or dismounting of tire accessories (e.g. snow chains or the like). The system or method according to the invention can therefore advantageously be used as already mentioned initially to detect and/or characterize such driving circumstances. In one embodiment this (for example, at least partially or completely) is accomplished in the sensor module (using the first and/or second evaluation device optionally located there). In another embodiment this takes place (at least partially or completely) in a vehicle-side, e.g. central control device of the vehicle.

In a further development of the invention, in the course of a further processing or further use of the tire contact area parameter calculated by the second evaluation device, an analysis is made as to whether the development of the tire contact area parameter observed over a relatively long time interval is plausible (e.g. taking into account the time evolution of the vehicle longitudinal speed) or whether time variations occur which suggest particular driving circumstances of the type already mentioned above.

Further, one aspect of the invention relates to a method for determining at least one tire contact area parameter characterizing a dimension of a tire contact area on a tire of a wheel of a vehicle, wherein the method comprises the following steps. A sensor signal which is dependent on a mechanical tire loading at a predetermined measuring point on the tire is received by means of a sensor of a sensor module arranged on the tire. In addition, the received sensor signal is evaluated and based thereon data comprising at least one data element which specifies at least one time point in the sensor signal characterizing a passage of the measuring point through the tire contact area are provided, by means of a first evaluation device contained by the sensor module. In addition, the tire contact area parameter is calculated by evaluating the data provided by the first evaluation device by means of a second evaluation device. By means of the first evaluation device an analysis of the sensor signal is further made by reference to at least one predetermined evaluation criterion relating to the signal quality of the sensor signal in order to provide quality information characterizing the signal quality of the sensor signal.

The particular designs and embodiments explained above for the system according to the invention can also be used similarly, individually or in combination, as particular designs or embodiments of the method according to the invention.

In addition to the system and the method for determining at least one tire contact area parameter, the present invention according to a further aspect also proposes the use of such a system and/or such a method for detecting and/or characterizing (e.g. quantifying) at least one driving circumstance, in particular for detecting and/or characterizing one or more of the following driving circumstances:
  a condition of ground on which the vehicle is traveling, in particular a bad road,
  an imbalance at the relevant wheel of the vehicle,
  a tire accessory mounted on the vehicle, in particular a snow chain mounted on the vehicle,
  a slippage at the relevant wheel of the vehicle,
  an aquaplaning.

Alternatively or additionally the following can also be characterized within the framework of the invention, for example:
  a wheel load at the relevant wheel of the vehicle, and/or
  a tire tread depth of the tire at the relevant wheel of the vehicle.

Furthermore, within the framework of the invention, for example a detection can be made as to whether the sensor module arranged on the tire is arranged correctly (or has for example become loose, twisted or has completely detached). This detection can also be made by evaluating the result of the sensor signal analysis.

In addition, a further aspect of the invention relates to a computer program product comprising a program code which, when executed on a program-controlled first evaluation device in a system according to any one of the aforesaid embodiments, performs at least all the steps to be performed by means of this first evaluation device according to the aforesaid embodiments.

In addition, a further aspect of the invention relates to a vehicle comprising a system according to any one of the aforesaid embodiments. The vehicle is, for example, a motor vehicle, in particular an automobile or a truck.

BRIEF DESCRIPTION OF THE SEVERAL VIEWS OF THE DRAWING

The invention is further described hereinafter with reference to exemplary embodiments with reference to the appended drawings. In the figures.

DESCRIPTION OF THE INVENTION

Figure 1:
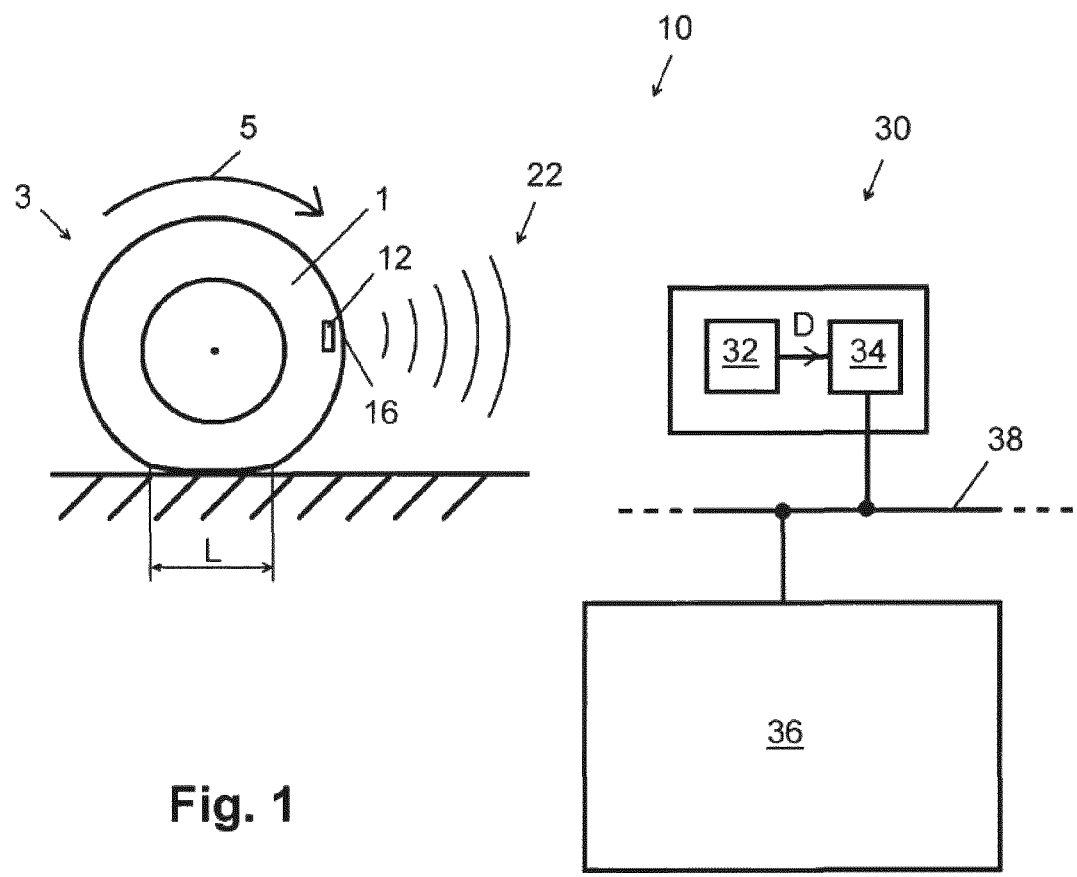
FIG. 1 shows a schematic block diagram of a system for determining a tire contact area parameter according the one exemplary embodiment.

FIG. 1 shows an exemplary embodiment of a system 10 for determining at least one tire contact area parameter characterizing a dimension of a tire contact area on a tire 1 of a wheel 3 of a vehicle.

That part of a tire which is in contact with the ground (e.g. road surface) is designated as tire contact area. The resulting contact area (tire contact area) is also designated as tire contact area and can, for example, be characterized by a dimension of this area in the longitudinal direction or rolling direction, the contact area length, as well as for example by a dimension in the transverse direction, the contact area width.

In the exemplary embodiment shown the vehicle is a motor vehicle having, for example, four wheels of the type shown in FIG. 1, wherein the system 10 is used for wheel-individual determination of a contact area length L and optionally further wheel operating parameters (e.g. tire inner pressure, temperature etc.) of the individual wheels.

This determination will be explained hereinafter for the example of the wheel 3 shown in FIG. 1, wherein here a detailed discussion is only made of the determination of the contact area length L (as the tire contact area parameter to be determined).

The system 10 comprises a tire-based sensor module 12, i.e. arranged on the tire 1, which is arranged on an inner side of the tire 1 filled with a pressure medium (typically air or nitrogen), for example, battery-operated and held exchangeably in a pocket on the inner side of the tire tread.

Figure 2:
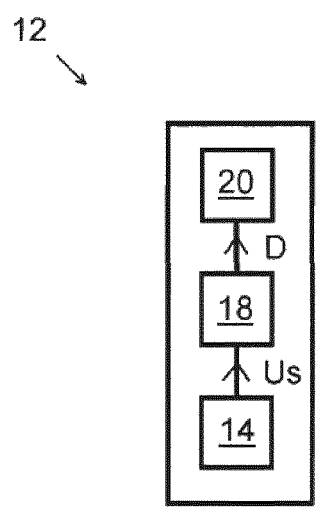
FIG. 2 shows a schematic block diagram of a sensor module used in the system of FIG. 1.

As shown in FIG. 2, the sensor module 12 comprises a sensor 14 for receiving a sensor signal Us dependent on a mechanical tire loading at a predetermined measuring point 16 on the tire 1 (cf. also FIGS. 3 to 6) and a first evaluation device 18 for evaluating the sensor signal Us. Based on this evaluation, the first evaluation device 18 provides data D, which contain at least one data element which specifies at least one time point in the sensor signal Us characterizing a passage of the measuring point 16 through the tire contact area.

Finally in the example shown the sensor module 12 comprises a transmitting device 20, in order to transmit the data D provided by the first evaluation device 18 to a receiving and evaluation device 30 of the system 10 here arranged on the vehicle side.

In the example shown, the transmitting device 20 is configured as a transmitter for the wireless transmission of the data D, e.g. by means of a radio signal 22 according to a digital transmission protocol.

Figure 3:
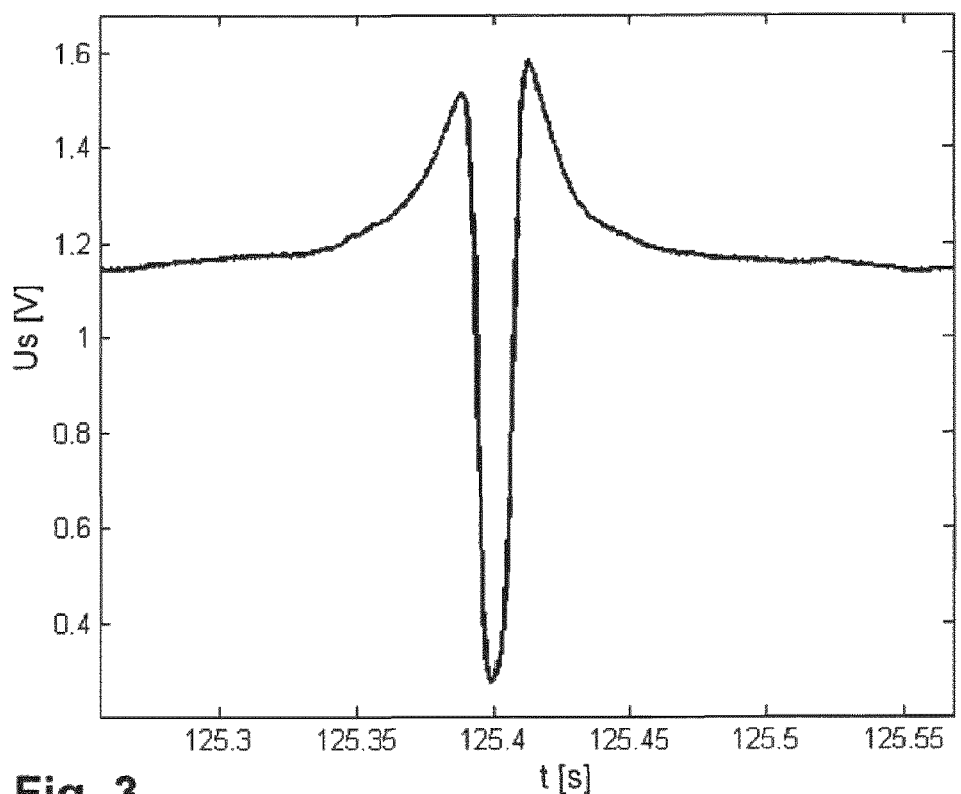
FIG. 3 shows an exemplary profile of a sensor signal Us delivered by a sensor of the sensor module from FIG. 2 as a function of the time t, plotted for approximately one period length.

FIG. 3 shows as a function of the time t an exemplary profile of the sensor signal Us, which is received by the sensor 14 of the tire-based sensor module 12 during a revolution (cf. arrow 5) of the wheel 3. The sensor signal Us received, for example, by the sensor 14 which here is sensitive to accelerations, has the following signal characteristics which can be seen from FIG. 3: as long as the measuring point 16 is located outside the tire contact area, the sensor signal Us is substantially constant, corresponding to a substantially constant centrifugal acceleration acting on the sensor 14. When the measuring point 16 passes the tire contact area however, significant variations of the sensor signal Us are obtained, from which in particular an impact of the measuring point 16 on the ground over which the vehicle is traveling and the subsequent raising of the measuring point 16 from this ground can be read off. These two processes result in two defined maxima in the signal profile, which can be identified in FIG. 3 approximately at the time points t=125.39 s and t=125.41 s. The latter time points therefore characterize a beginning and an end of a time interval for the passage of the measuring point 16 through the tire contact area.

When considered in time, a defined minimum in the signal profile is obtained between these two maxima, in FIG. 3 approximately at t=125.40 s, which is characteristic for a center of the time interval for passage of the tire contact area.

The first evaluation device 18 contained in the tire-based sensor module 12 in the example shown provides the data D with data elements which specify resulting beginning and end time points of the tire contact area passages for the more or less periodically occurring signal characteristics depending on the driving speed of the type shown in FIG. 3.

The data D transmitted continuously or, for example, in order to save energy only from time to time by the transmitting device 20 thus contain information about the contact area length L which can be calculated from the difference between the beginning and end time points for each tire contact area passage, namely for example when the wheel circumferential speed (e.g. from the vehicle longitudinal speed) is known. Alternatively or additionally to a use of a wheel rotational speed or wheel circumferential speed determined in a different manner, the time interval of successive tire contact area passages can also be evaluated in this calculation, for example, in order to determine the wheel rotational speed or wheel circumferential speed from the data D themselves.

As a result of the evaluation of the sensor signal performed by means of the first evaluation device 18 and provision of the data D with relevant information for determining the at least one relevant tire contact area parameter (here contact area length L) and coded by means of the data elements, a substantially lower energy requirement is advantageously obtained for implementing the transmission of information to the vehicle-based receiving and evaluation device 30 compared with a transmission of information completely characterizing the sensor signal Us (raw signal).

Returning to FIG. 1, the vehicle-side receiving and evaluation device 30 arranged here for example in a fixed manner in relation to a vehicle body comprises a receiving device 32 for receiving the radio signal 22 and for providing the data D demodulated therefrom and a second evaluation device 34 for calculating the contact area length L by evaluating the data D originating from the first evaluation device 18 on the sensor module side and in the example shown, transmitted to the second evaluation device 34 by means of the receiving device 32.

In order to enable a further use of the contact area length L thus determined in a central control device 36 of the vehicle, the second evaluation device 34 is connected in communication with the central control device 36 via a bus system 38, e.g. according to a conventional standard such as, for example, CAN etc.

Unlike the exemplary embodiment shown in FIG. 1, the second evaluation device 34 could also be implemented as a functionality of the central control device 36 present in any case in the vehicle, wherein in this case merely a communication connection (e.g. by means of the bus system 38) would need to be provided between the receiving device 32 and the central control device 36.

Furthermore, unlike the exemplary embodiment shown, the second evaluation device 34 could also be incorporated in the tire-based sensor module 12 and for this purpose, for example, combined structurally with the first evaluation device 18 which is present there in any case. In this case, the two evaluation devices 18, 34 could be implemented as respective partial functionalities of a (single) total evaluation device. In such a modification of the system 10, the transmitting device 20 on the sensor module side could then expediently transmit data containing at least one data element which specifies the contact area length L already calculated on the sensor module side, wherein the vehicle-side receiving device 32 then communicates the data, for example, directly to the central control device 36.

Figure 4:
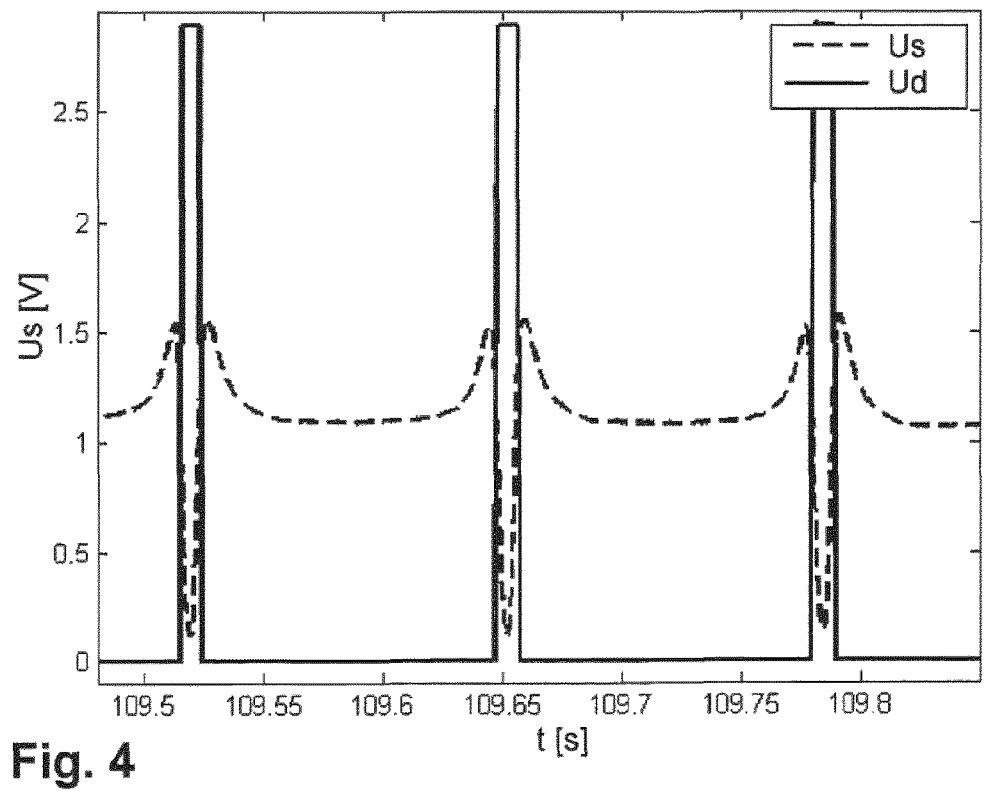
FIG. 4 shows a diagram similar to FIG. 3 but for approximately three period lengths, wherein a digital tire contact area signal Ud produced by means of the sensor signal Us is additionally plotted.

FIG. 4 is an exemplary diagram, similar to FIG. 3, of a time profile of the sensor signal Us (dashed line) for three successive tire contact area passages, wherein in addition a digital tire contact area signal Ud (continuous line) is plotted by means of which the determination of the beginning and end time points of the tire contact area passages by means of the sensor signal Us is illustrated for this example. Based on the properties of the sensor signal Us already described with reference to FIG. 3, the digital tire contact area signal Ud can be calculated by means of a suitable algorithm, here for example detecting the aforementioned signal maxima, which signal changes in each case at the beginning of a tire contact area from logic "0" to logic "1" and at the end of the tire contact area changes again from logic "1" to logic "0". The more or less periodically recurring time intervals in which the signal Ud has the value "1" are, as already explained above, characteristic for the contact area length L or can be converted as explained into the contact area length L of the relevant tire contact area passages.

The digital tire contact area signal Ud shown in FIG. 4 is produced on the sensor module side by evaluation of the sensor signal Us by the first evaluation device 18. It contains information about the beginning and end time points of the tire contact area passages and is used in the course of a further processing by the evaluation device 18 to produce the data D to be provided to the transmitting device 20. As already mentioned, for this purpose data elements contained in the data D specify these time points characterizing the tire contact area passages.

In the profile of the sensor signal Us shown in FIG. 4 which was recorded under largely perturbation-free conditions, the two maxima each characterizing each tire contact area passage and the interposed minimum are formed very clearly. Thus, the respective entry and exit of the measuring point 16 during the tire contact area passage can be determined very reliably by the evaluation algorithm performed in a program-controlled manner by the first evaluation device 18 and can be coded by means of the relevant data elements in the provided data D. The calculation algorithm performed by the second evaluation device 34 can thus reliably and accurately calculate the contact area length L.

Figure 5:
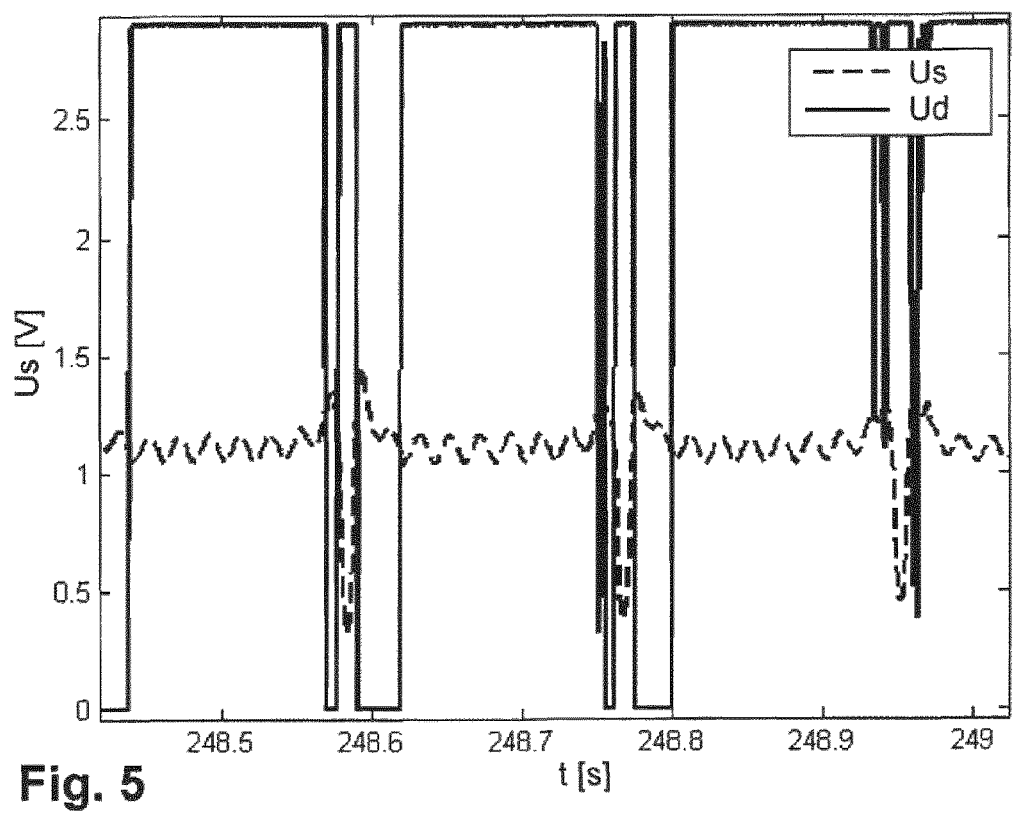
FIG. 5 shows a diagram similar to FIG. 4 but for the case of a perturbation of the sensor signal Us by electromagnetic perturbing radiation.
Figure 6:
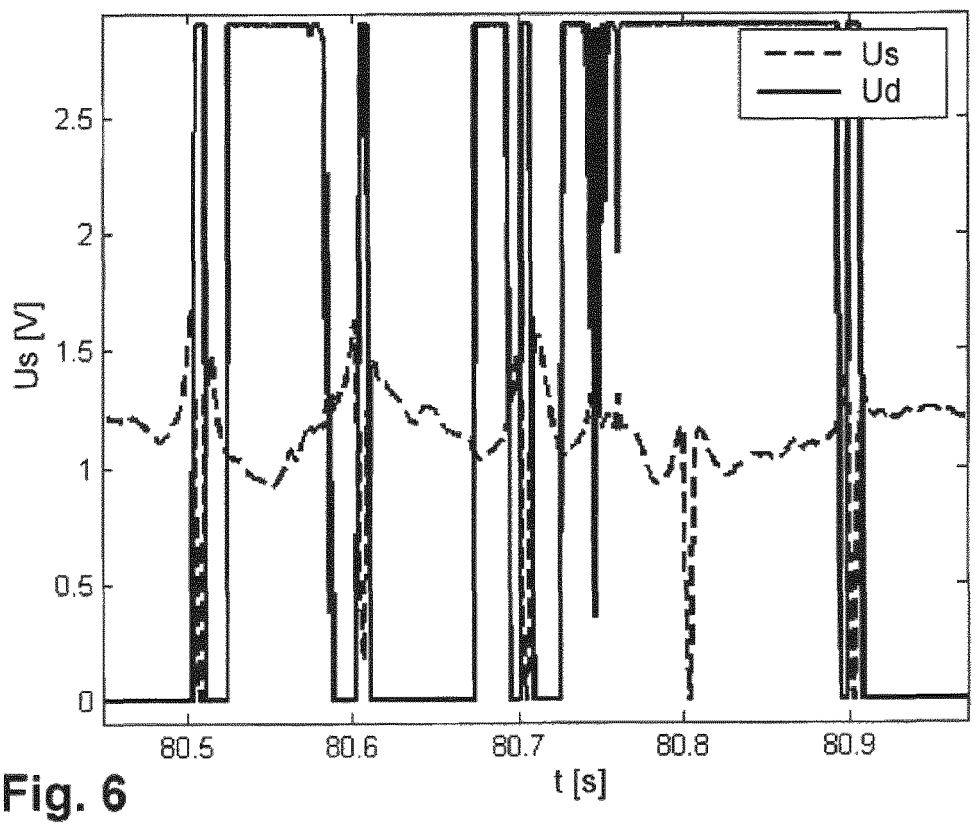
FIG. 6 shows a diagram similar to FIG. 4 but for the case of a perturbation of the sensor signal Us by roadway unevennesses.

Problematical however are situations in which perturbing influences act on the tire 1 or the sensor module 12 arranged on the tire 1 so that the sensor signal Us or the useful information contained therein is falsified. In such situations the reliability or quality of the tire contact area determination can be adversely affected. Such adverse effects can be dependent on many different external influences. With reference to FIGS. 5 and 6, two examples of a perturbation of the sensor signal reception or the method for determining the tire contact area based thereon are explained hereinafter.

FIG. 5 again shows in a diagram corresponding to FIG. 4 the time profile of a sensor signal Us received by the sensor 14 (dashed line) and of a digital tire contact area signal Ud (continuous line) generated for this purpose with the same evaluation algorithm, but for a situation in which the vehicle is exposed to electromagnetic perturbing radiation having a frequency of here, for example, 50 Hz by driving on a road in the vicinity of overhead power lines carrying AC current. This perturbing radiation can possibly, as can be seen from FIG. 5, have the result that a 50 Hz oscillation (perturbing signal component) is modulated on the sensor signal Us to a certain extent. As a result of this perturbing signal component in the sensor signal Us, the evaluation algorithm is apparently no longer able to deliver a digital tire contact area signal Ud which is suitable for a meaningful calculation of the contact area length L. It is already no longer possible to unambiguously identify the individual tire contact area passages in the digital tire contact area signal Ud. Within the framework of the invention however it is conceivable in this case that based on a "50 Hz perturbation identification" a perturbation suppression adapted thereto (here: filtering out the 50 Hz oscillation) is applied to the sensor signal before the data D for determining the tire contact area parameter (here: contact area length L) are produced. The same applies to other identified perturbations, i.e. a specific reduction of the perturbations in the signal (perturbation suppression) can be made in each case based thereon.

FIG. 6 shows in a diagram corresponding to FIGS. 4 and 5 another example particularly relevant in practice, in which namely the sensor signal Us was recorded during travel over uneven ground (here: non-tarmacked road) or another bad road. Here also the sensor signal Us exhibits a severe falsification which, as can be seen from the digital tire contact area signal Ud in FIG. 6 produced by means of the evaluation algorithm, makes an unambiguous detection of the tire contact area or calculation of the contact area length L impossible in some circumstances.

Within the framework of the invention, in this case however, for example, based on a result of the signal analysis, a detection and/or characterization of the ground specifically traveled on can advantageously be implemented.

For example, for this purpose signal perturbation classes which have previously been determined experimentally and which can then be retrieved in the method according to the invention corresponding to the causative ground classes in each case (e.g. asphalt surface, dirt track, cobbled road etc.) can be used in an evaluation of signal quality parameters obtained by the signal analysis (e.g. specific signal-noise ratios, properties of the noise frequency spectrum and/or of the signal frequency spectrum etc.).

In addition to the perturbing influences illustrated above with reference to FIGS. 5 and 6, in practice there are many other external influences which change the ideal signal characteristic obtained under ideal conditions depending inter alia on the sensor used and the driving speed of the vehicle (optionally also taking account of tire operating parameters such as a tire inner pressure and a tire temperature and other vehicle operating parameters such as the load or the wheel load on the relevant wheel).

An example for such perturbing influences are snow chains attached to the wheels of the vehicle, slippage, aquaplaning or the like.

When determining the contact area length L in the manner described so far for the system 10, there is therefore basically the risk that the result of the tire contact area calculation will be inaccurate, unreliable or even completely unusable as a result of perturbing influences of the type explained so that further processing based on the relevant tire contact area parameter or uses of the same, e.g. in the central control device 36 are affected.

However, this problem is avoided in the system 10 or the method carried out therewith for determining the tire contact area by a particular feature of the first evaluation device 18 which consists in that this performs an analysis of the sensor signal Us by means of at least one predetermined evaluation criterion relating to the signal quality of the sensor signal Us in order (as a result of this analysis) to provide quality information characterizing the signal quality of the sensor signal Us.

As a result of the quality information thus provided within the system 10, depending on the evaluation criterion/criteria used, a plurality of perturbing influences can be detected and advantageously taken into account in manifold ways in all the process steps following the analysis of the sensor signal (including the evaluation of this sensor signal Us also based on the sensor signal Us to provide the data D), and/or can even be used to obtain further useful information such as, for example, relating to the already mentioned driving circumstances.

In particular, the first evaluation device, for example, depending on a result of the analysis, can perform a quantification of the signal quality of the sensor signal Us, for example, by incorporating the value of a signal-noise ratio determined on the sensor signal Us in the provided quality information. Alternatively or additionally, a classification of the signal quality of the sensor signal Us into at least one quality class of a multiplicity of predetermined quality classes can also be performed, for example a classification into a class "signal quality good" or a class "signal quality poor" (and/or for example into three classes "flat ground", "uneven ground", "very uneven ground" etc.).

Such a quantification and/or classification can be implemented by the quality information provided by the first evaluation device 18 containing one or more quantification values or one or more quantification details (e.g. as so-called "flags" in a digital data element). Depending on these information components in the quality information, for example the central control device 36 of the vehicle can decide whether a relevant tire contact area parameter (in the example the contact area length L) is actually used for uses based thereon or make a choice according to which depending on the quality information, in particular a quantification and/or classification, specific uses from a plurality of uses provided in the case of problem-free signal quality are actually implemented or not.

In one embodiment, depending on a result of the analysis of the sensor signal Us, the first evaluation device 18 brings about an incorporation of at least one further data element characterizing the signal quality of the sensor signal Us in the data D to be provided by the first evaluation device. Thus, the quality information can be further communicated, for example, in a simple manner in the entire system since the data D are provided in any case for example to the second evaluation device 34. The accommodation of further data elements in the data already containing data elements in any case therefore requires no additional communication path which is in particular a great advantage, for example, when the second evaluation device 38 is arranged as shown not in the tire-based sensor module 12 but at another point in the vehicle (vehicle side) and a wireless transmission connection (e.g. radio connection) is used.

Another advantage consists in the fact that each device downstream of the first evaluation device 18, which receives the data D, here therefore for example the central control device 36 of the vehicle, can itself decide how the result of the tire contact area measurement is to be handled. Thus, for example, in some circumstances determination results based on a suboptimal signal quality can still be useful for non-safety-relevant uses.

Alternatively or additionally to the incorporation of a further data element characterizing the signal quality of the sensor signal Us, it can be provided that depending on a result of the analysis, the provision of the data D by the first evaluation device 18 is prevented. In this case, which can be provided, for example, in the case of particularly poor signal quality (given for example by means of the said quantification or classification), the second evaluation device 34 consequently (temporally) receives no data provided. Consequently in these relevant situations, the contact area length L is also not calculated. Thus, any use of an unreliably calculated tire contact area parameter can be simply prevented.

The two previous variants, on the one hand a prevention of the provision of the data and on the other hand the incorporation of at least one further data element in the data to be provided are explained hereinafter by way of example with reference to FIGS. 7 and 8.

Figure 7:
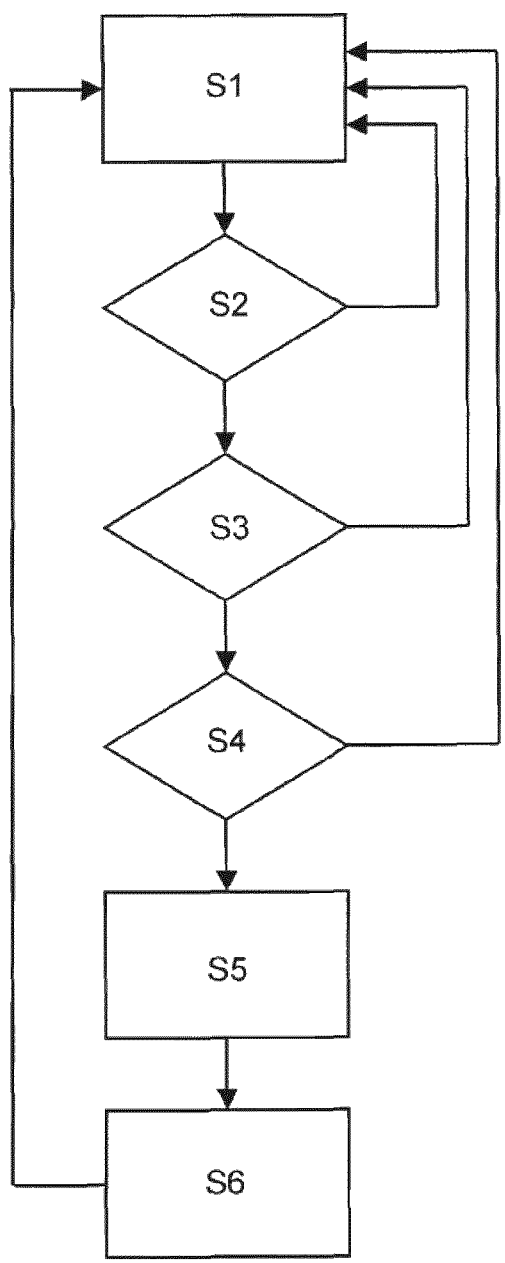
FIG. 7 shows a flow diagram of a method for determining a tire contact area parameter according to one embodiment.

FIG. 7 is a flow diagram of a method for determining at least one tire contact area parameter such as, for example, can be performed by a system of the type already described above with reference to FIGS. 1 to 6.

In a step S1 the sensor signal Us dependent on a mechanical tire loading at a predetermined measuring point on the tire is received.

In a step S2 the sensor signal Us is analyzed by reference to a first evaluation criterion relating to the signal quality of the sensor signal Us, here for example by reference to a signal-noise ratio criterion. Only if this signal-noise ratio criterion is fulfilled, which should be the case for a relatively large (good) signal-noise ratio determined in a certain manner, the analysis is continued with a step S3. Otherwise the processing goes back to step S1 so that the analysis is ended at this point.

With the signal-noise ratio criterion it could be checked with reference to the signal profile in FIG. 3 for example whether (at least in the case of substantially constant vehicle longitudinal speed) the height of the sensor signal Us before the first maximum approximately corresponds to the height of the sensor signal Us after the second maximum. This check can be made, for example, by means of a threshold-value comparison of the difference of the said signal heights.

Apart from the aforementioned examples for a usable signal-noise ratio, other ratios can also be formed for this, which for example relate in a suitable manner an average power of the useful signal component with an average noise power.

In step S3 it is checked whether a further evaluation criterion for the signal quality of the sensor signal Us, here for example a frequency criterion, is fulfilled. Only if the frequency criterion is fulfilled does the processing proceed further to a step S4. Otherwise, the processing goes back to step S1 and thus ends the analysis.

The frequency criterion used in step S3 can in particular comprise a criterion which is to be fulfilled by a frequency spectrum of the sensor signal Us obtained by means of frequency analysis. For this purpose, the frequency spectrum of the sensor signal Us can be calculated, for example, by means of FFT ("fast Fourier transform") in order to investigate this for the presence of certain frequency components. For example, it is clear that at constant driving speed (but also when accelerations or decelerations of the vehicle are not too great), a clear frequency component should be identifiable in the sensor signal Us which corresponds to the wheel rotational frequency.

In the case of a tire contact area characteristic as shown in FIG. 3, an identifiable frequency component should also be obtained at a comparatively higher frequency which corresponds to the frequency of the identifiable oscillation of the sensor signal Us (two maxima and an interposed minimum), in the center of FIG. 3, at the tire contact area passage.

Based on this is another possibility of checking within the framework of a frequency criterion whether the ratio of the two aforesaid frequencies lies in a predetermined range. This is based on the consideration that both the wheel rotational frequency and also the frequency of the oscillation formed by the two maxima and the interposed minimum are proportional to the driving speed, which is equivalent to a fixed ratio of these two frequencies.

It is clear from this example that when checking a frequency criterion, the vehicle longitudinal speed and/or a rotational speed of the relevant wheel can also advantageously be taken into account. In this case, not only the presence of the two frequency components and their ratio to one another can namely be checked but also their consistency with regard to the vehicle longitudinal speed or wheel rotational speed. Wheel parameters required for such a check such as in particular the diameter or circumference of the relevant wheel can, for example, advantageously be stored in prestored fashion in the sensor module.

Furthermore a frequency spectrum obtained on the sensor signal Us can also be checked, for example, for a presence of one or more typical perturbing frequencies (e.g. 50 Hz). After a determination of such frequency components ascribable to specific perturbing influences, these can even be specifically filtered out from the sensor signal Us in order to increase the quality of the provision of data. Also typical eigenfrequencies can be identified in the frequency spectrum, for example, for a relevant tire and by means of their intensity, for example, can be used for the detection and/or classification of driving circumstances.

Finally, obtaining a frequency spectrum of the sensor signal Us can also advantageously be used to indicate an increased noise component in the sensor signal Us. In this case, the checking of the frequency spectrum can also be used as part of the checking for fulfillment of a signal-noise ratio criterion (step S2 in FIG. 7).

In step S4 another check of the sensor signal is then made using another evaluation criterion which also relates to the signal quality of the sensor signal Us.

With reference to the example of a tire contact area characteristic in the sensor signal Us shown in FIG. 3, in step S4, for example, the shape of the two maxima can be checked as to whether this corresponds to the shape obtained under ideal conditions (e.g. with reference to signal parameters such as a width of the maxima relative for example to their height and/or with reference to other parameters determined from the signal profile).

Only when this third evaluation criterion is also ascertained as fulfilled in step S4, does the processing proceed further to a step S5. Otherwise the processing goes back to step S1 so that the analysis is ended.

In particular, when using at least one signal-noise ratio criterion and/or at least one predetermined frequency criterion in steps S2 to S5, it can also be provided by means of a pattern recognition performed in the course of the analysis of the sensor signal Us to implement a detection and/or characterization of predetermined operating circumstances. For example, certain ground conditions (e.g. tarmacked road, cobblestones, dirt road, snow-covered roadway etc.) can bring about specific characteristics in the sensor signal Us which can for example be determined experimentally beforehand. Such characteristics can be identified by pattern recognition and optionally specified (characterized) more precisely. This as part of the quality information provided by the first evaluation device.

In step S5 an evaluation is made of the received sensor signal Us and, based thereon, data D are provided with at least one data element which specifies at least one time point in the sensor signal Us characterizing a passage of the measuring point through the tire contact area. This evaluation is performed by means of the same evaluation device which also checks whether the aforesaid evaluation criteria are fulfilled.

Then in a step S6 the at least one tire contact area parameter is finally calculated (or updated) by evaluating the data provided in step S5 by means of a second evaluation device, which however can also be combined structurally with the first evaluation device.

In step S5 the data are optionally also transmitted (e.g. wirelessly transmitted) to the second evaluation device if this is arranged separately from the first evaluation device.

In the exemplary embodiment according to FIG. 7 it is thus provided that a plurality of evaluation criteria (here: three evaluation criteria) relating to the sensor signal quality are checked and in the event that at least one evaluation criterion is not fulfilled, the provision of data is prevented.

Figure 8:
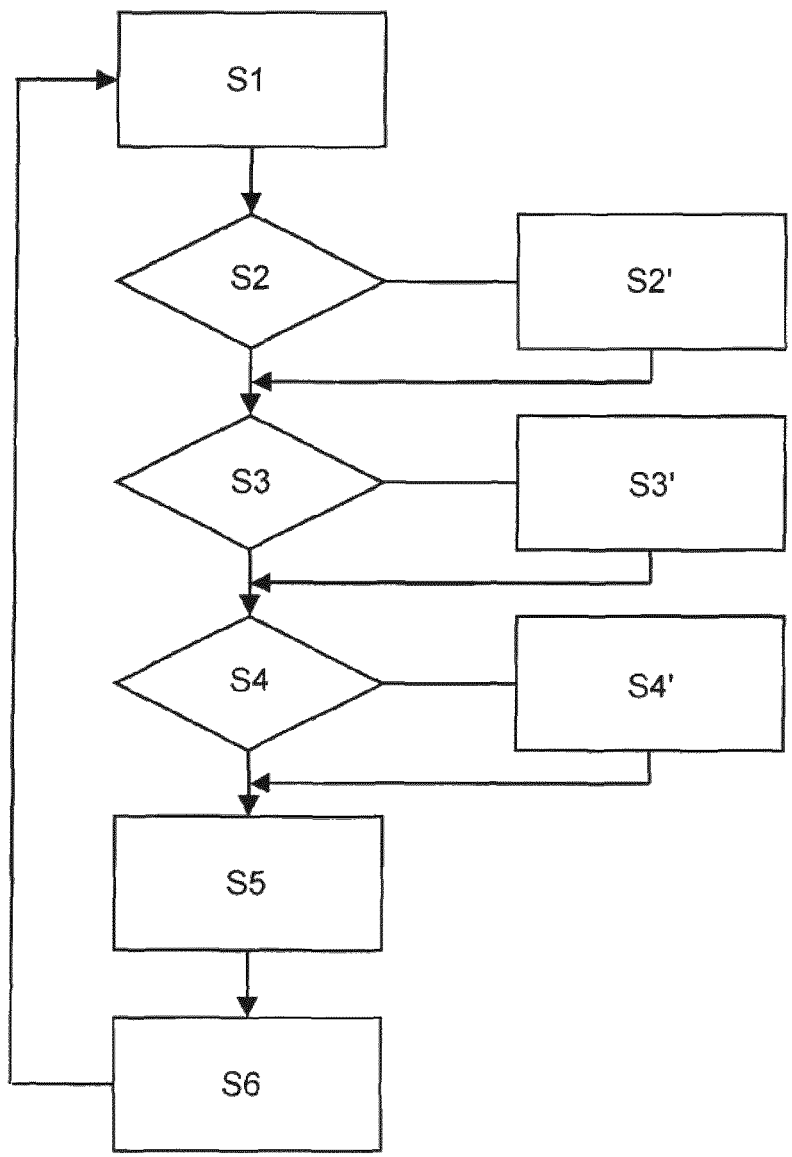
FIG. 8 shows a flow diagram of a method for determining a tire contact area parameter according to a further exemplary embodiment.

FIG. 8 is a flow diagram of an alternative method for determining at least one tire contact area parameter such as can be performed, for example, by a system of the type already described above with reference to FIGS. 1 to 6.

Steps S1 to S6 provided according to this method are also provided in principle precisely as in the example according to FIG. 7 apart from a small modification. The modification merely consists in that in steps S2, S3 and S4, i.e. the respective checking for fulfillment of a predetermined evaluation criterion, in the event that the respective evaluation criterion is not fulfilled, the processing does not go back to step S1 but, as shown in FIG. 8, goes to a respective subsequent step S2', S3' or S4' in which a further data element specifying the result of the relevant partial analysis is produced (calculated) and buffered. Such further data elements can therefore, for example, in particular code a quantification and/or classification of the sensor signal quality with regard to a signal quality parameter checked by the relevant evaluation criterion. In addition, after performing these subsequent steps S2', S3' and S4', the processing also does not go back to step S1 but, as can be seen in FIG. 8, to the respectively following examination step S3 or S4 or in the case of the last subsequent step, here step S4', further to step S5.

According to the example of FIG. 8, depending on a result of the analysis performed by the first evaluation device, if necessary at least one further data element is thus incorporated in the data provided in step S5.

For both preceding embodiments according to FIG. 7 and FIG. 8 it holds that: in the analysis of the sensor signal Us by the first evaluation device, for example, a sliding time window comprising a plurality of tire contact area passages can be used as the basis for the application of the relevant evaluation criteria or evaluation algorithms.

The terms "frequency analysis" and "frequency spectrum" used here should not necessarily mean that the relevant evaluation algorithm investigates the spectrum in the "frequency space" when viewed mathematically. As a variant to this, it is also considered to perform such an investigation in the "time space", i.e., for example, to verify whether, for a measured or otherwise determined driving speed, the mutual time intervals between the tire contact area characteristics detected in the sensor signal Us have the correct time interval (a tire contact area characteristic in the sensor signal Us is to be expected for every 360° of wheel rotation). All detections between such signal characteristics to be expected more or less periodically (with every 360° revolution of the wheel) would not be plausible and could for example prevent a provision of the data or be corrected out accordingly when generating data or (e.g. in a quantified or classified form) be coded in further data elements of the data to be provided.

Furthermore, when analyzing the sensor signal Us, for example, a measured or otherwise determined vehicle acceleration can be taken into account. Since, for example, for the signal example of FIG. 3 the signal profile, in particular the height of the two maxima is dependent on the vehicle speed, a plausible range of values can be defined for each driving speed and it can be checked whether the maximum values determined on the sensor signal Us lie in this range of values. Alternatively or additionally such a check can also be made for the value of the minimum using a corresponding range of values.

Another possibility consists in performing a plausibilization of the time evolution of the sensor signal Us or signal characteristics detected on this with time and optionally also performing such a plausibilization on the basis of the temporally evolving calculated tire contact area parameters. If for example the vehicle does not accelerate rapidly, the calculated contact area lengths L should vary over time more or less continuously and only with a comparatively small gradient.

In such an investigation of the time evolution of certain quantities, whether this be quantities contained in the quality information or the relevant tire contact area parameter itself, for example outliers (individual implausible measurement results) can be eliminated in the course of the analysis of the sensor signal Us before the data are provided or calculated.

In summary, the invention provides an advantageous system and method for determining at least one tire contact area parameter, in particular for example one contact area length. With an evaluation of the signal quality at the sensor level, it can in particular for example be accomplished that only suitable values from a tire contact area measurement for a respective use are transferred to further functions of a control device in the vehicle. Particularly advantageously the evaluation of the signal quality can take place particularly precisely here. A subsequent evaluation of the reliability of the tire contact area parameter by means of only the tire contact area parameters calculated using a simple evaluation algorithm would not be possible since the detailed nature of information is no longer present in the information-reduced data signal, as is the case at the sensor level. A preferred use is the detection and/or characterization of driving circumstances (e.g. snow chain, bad road, slippage etc.).

REFERENCE LIST

1 Tire
3 Wheel
5 Rotation (of the wheel)
10 System
12 Sensor module
14 Sensor
16 Measuring point
18 First evaluation device
20 Transmitting device
22 Radio signal
30 Receiving and evaluation device
32 Receiving device
34 Second evaluation device
36 Central control device
38 Bus system
L Contact area length
Us Sensor signal
Ud Tire contact area signal
D Data

The invention claimed is:

1. A system for determining at least one tire contact area parameter characterizing a dimension of a tire contact area of a tire on a wheel of a vehicle, the system comprising:
   a sensor module disposed on the tire, said sensor module including:
      a sensor configured to acquire a sensor signal that is dependent on a mechanical tire loading at a predetermined measuring point on the tire; and
      a first evaluation device configured to evaluate the sensor signal and to provide data based on the sensor signal, the data containing at least one data element specifying at least one time point in the sensor signal characterizing a passage of the measuring point through the tire contact area;
      said first evaluation device being configured to perform an analysis of the sensor signal with reference to at least one predetermined evaluation criterion relating to a signal quality of the sensor signal in order to provide quality information characterizing the signal quality of the sensor signal; and
   a second evaluation device configured to calculate the tire contact area parameter by evaluating the data provided by said first evaluation device;
   wherein the evaluation criterion relating to the signal quality of the sensor signal used in the analysis performed by said first evaluation device includes information that a signal-to-noise ratio of the sensor signal fulfills at least one predetermined signal-to-noise ratio criterion.

2. The system according to claim 1, wherein said first evaluation device is further configured to perform a quantification of the signal quality of the sensor signal depending on a result of the analysis.

3. The system according to claim 1, wherein said first evaluation device is further configured to perform a classification of the signal quality of the sensor signal into at least one quality class of a plurality of predetermined quality classes.

4. The system according to claim 1, wherein said first evaluation device is further configured to incorporate at least one further data element characterizing the signal quality of the sensor signal in the data to be provided depending on a result of the analysis.

5. The system according to claim 1, wherein said first evaluation device is further configured to prevent the data from being provided depending on a result of the analysis.

6. The system according to claim 1, wherein said sensor module is disposed on an inner side of the tire and said sensor is configured to produce the sensor signal depending on at least one or both of a local tire deformation or an acceleration at the location of said sensor module.

7. The system according to claim 1, wherein the at least one data element in the data provided by said first evaluation device represents a data point in the sensor signal selected from the group consisting of a beginning, a center, and an end of a time interval during which the measuring point passes through the tire contact area.

8. The system according to claim 1, wherein the evaluation criterion relating to the signal quality of the sensor signal used in the analysis performed by said first evaluation device includes information that a frequency spectrum of the sensor signal obtained by frequency analysis fulfills at least one predetermined frequency criterion.

9. The system according to claim 8, wherein said first evaluation device is further configured to take into account one or both of a longitudinal vehicle speed or a rotational speed of a relevant wheel while determining whether or not the predetermined frequency criterion is fulfilled.

10. The system according to claim 1, wherein said second evaluation device is configured to output a parameter for characterizing one or more driving conditions selected from the group consisting of:
   a condition of a surface on which the vehicle is traveling,
   an imbalance at a relevant wheel of the vehicle,
   a tire accessory mounted on the vehicle;
   a slippage at the relevant wheel of the vehicle,
   aquaplaning,
   a wheel load at the relevant wheel of the vehicle,
   a tire tread depth of the tire at the relevant wheel of the vehicle, and
   a correct arrangement of the sensor module arranged on the tire.

11. A vehicle, comprising a system according to claim 1.

12. A method for determining a tire contact area parameter characterizing a dimension of a tire contact area of a tire on a wheel of a vehicle, the method comprising:
   providing a sensor module with a first evaluation device and a sensor disposed on the tire;
   acquiring a sensor signal with the sensor that is dependent on a mechanical tire loading at a predetermined measuring point on the tire;
   evaluating the sensor signal with the first evaluation device and providing, based on the sensor signal, data with at least one data element that specifies a time point in the sensor signal characterizing a passage of the measuring point through the tire contact area;
   analyzing the sensor signal with the first evaluation device by reference to at least one predetermined evaluation criterion relating to a signal quality of the sensor signal in order to provide quality information characterizing the signal quality of the sensor signal; and using a second evaluation device to evaluate the data provided by the first evaluation device for calculating the tire contact area parameter;

wherein the evaluation criterion relating to the signal quality of the sensor signal used in the analysis performed by said first evaluation device includes information that a signal-to-noise ratio of the sensor signal fulfills at least one predetermined signal-to-noise ratio criterion.

13. The method according to claim 12, which comprises using the parameter for characterizing and/or detecting driving circumstances selected from the group consisting of:
a condition of a surface on which the vehicle is traveling,
an imbalance at a relevant wheel of the vehicle,
a tire accessory mounted on the vehicle;
a slippage at the relevant wheel of the vehicle,
aquaplaning,
a wheel load at the relevant wheel of the vehicle,
a tire tread depth of the tire at the relevant wheel of the vehicle, and
a correct arrangement of the sensor module arranged on the tire.

14. The method according to claim 13, which comprises determining a condition of a road on which the vehicle is traveling or a mounting condition of a snow chain mounted on the vehicle.

15. A computer program product, comprising a non-transitory computer readable medium storing computer-readable program code configured to cause a computer to carry out the method according to claim 13 when the computer program product is executed on the computer.

* * * * *